July 21, 1925.

G. T. CLARK 1,546,825

PISTON RING

Filed March 2, 1920

Witness:
Oscar F. Hill

Inventor:
George T. Clark
by Chas. F. Randall
Attorney.

July 21, 1925.
G. T. CLARK
PISTON RING
Filed March 2, 1920
1,546,825
2 Sheets-Sheet 2
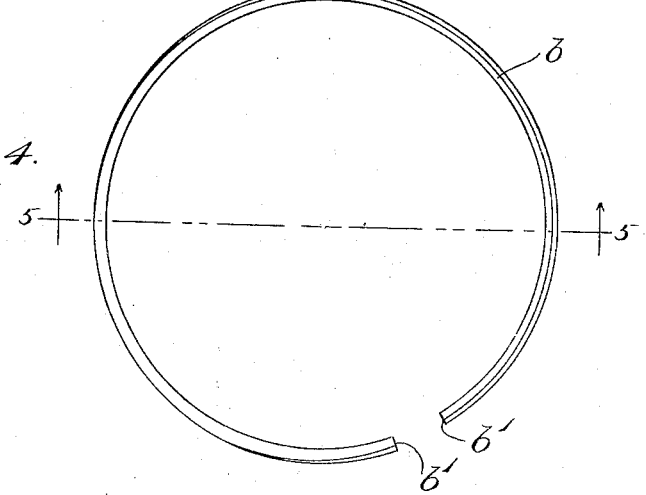
Fig. 4.
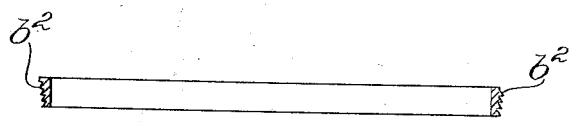
Fig. 5.
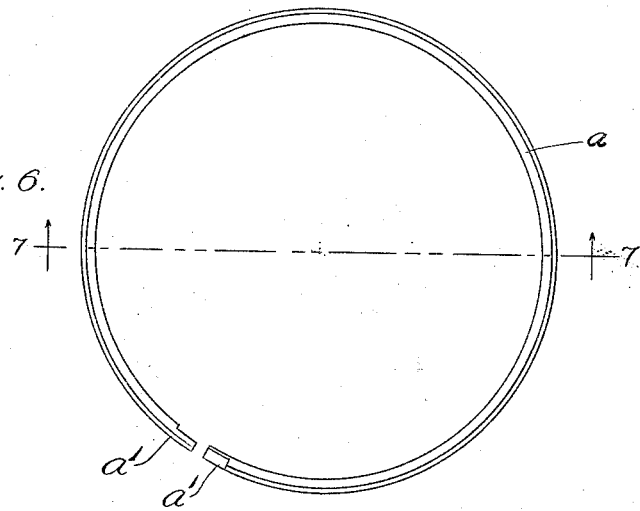
Fig. 6.
Fig. 7.
Witness:
Oscar F. Hill
Inventor:
George T. Clark
by Chas. F. Randall
Attorney.

Patented July 21, 1925.

1,546,825

UNITED STATES PATENT OFFICE.

GEORGE T. CLARK, OF OLD ORCHARD, MAINE.

PISTON RING.

Application filed March 2, 1920. Serial No. 362,673.

*To all whom it may concern:*

Be it known that I, GEORGE T. CLARK, a citizen of the United States, residing at Old Orchard, in the county of York, State of Maine, have invented a certain new and useful Improvement in Piston Rings, of which the following is a specification, reference being had therein to the accompanying drawings.

The invention relates to packing rings for pistons, more especially such as are used in connection with the pistons of internal combustion engines, although packing rings embodying the features of the invention are not necessarily restricted to use in that connection.

The invention is more particularly an improvement in packing rings of the class which are expansible in width to fit the grooves provided for their reception in the peripheries of pistons. It provides a packing ring having advantages over prior rings of such class.

The invention consists in a packing ring composed of divided ring-shaped members or elements which are combined with each other in novel manner whereby relative rotary shift of the same operates to vary the width of the assembled unit to fit the width of the piston groove which it occupies in use. In the preferred form of embodiment, the construction is such as to render the component elements or members of the packing ring self-adjusting.

The drawings illustrate the invention in the best forms of embodiment which I have thus far devised. In the drawings,—

Fig. 4 is a plan view of the inner element of the said packing ring, shown separately.

Fig. 5 is a view of the said inner ring-element in vertical section on line 5—5 of Fig. 4.

Fig. 6 is a plan of the outer ring-element, and Fig. 7 is a view thereof in vertical section on line 7—7 of Fig. 6.

Figure 1:
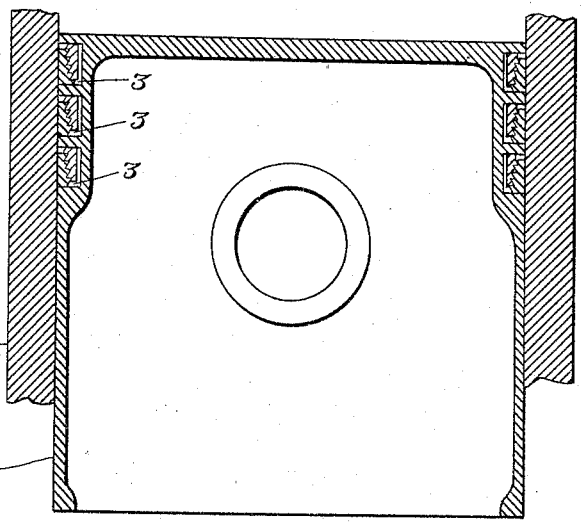
Fig. 1 shows a portion of an engine cylinder, and a piston, both in vertical section, the said piston having applied thereto packing rings of one of the forms aforesaid.
Figure 2:
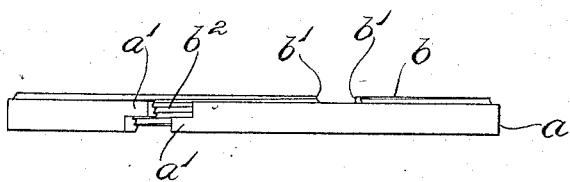
Fig. 2 is an edge view of one of the packing rings of Fig. 1 detached and in its expanded state.

In Fig. 1, the portion of an engine cylinder that is shown therein is marked 1, the piston being marked 2; and 3, 3, 3, are the grooves that are formed in the piston for the reception of packing rings, three such rings being shown in place.

Considered as a unit, a packing ring embodying the invention is composed of a plurality of component ring-shaped members or elements nested together one inside another in concentric or substantially concentric relationship. The form of embodiment illustrated by Figs. 1 to 7 comprises two such members or elements, namely an outer member or element $a$ and an inner one $b$, fitting together. The form illustrated by Fig. 8 comprises three of the said members or elements, namely two outer ones $a^9$, $a^9$, and an inner one, $b^9$, with said outer ones fitted to the upper and lower portions, respectively, of the periphery of the inner one.

To ensure the elastic fit against the inner surface of the engine cylinder that is required in the case of a packing ring, each of the ring-shaped members or elements is divided or open transversely, so that each member or element is what I term a divided ring, and each thereof is elastic and tends by its elasticity to assume a radially expanded condition in which its ends are separated from each other somewhat. The ends of an outer member or element are stepped to overlap with each other and form a stepped joint such as is usual and well-known in the case of packing rings, as in the case of the ends $a'$, $a'$, of the member $a$ in Figs. 2, 3 and 6. The ends of an inner member or element may be plain, as in the case of ends $b'$, $b'$, of member $b$, in Figs. 3 and 4. In practice, however, the ends of each of the rings composing a packing ring unit embodying the invention may be of step formation if deemed advisable.

Figure 8:
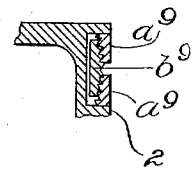
Fig. 8 is a sectional view illustrating another form of embodiment of the features of the invention.
Figure 3:
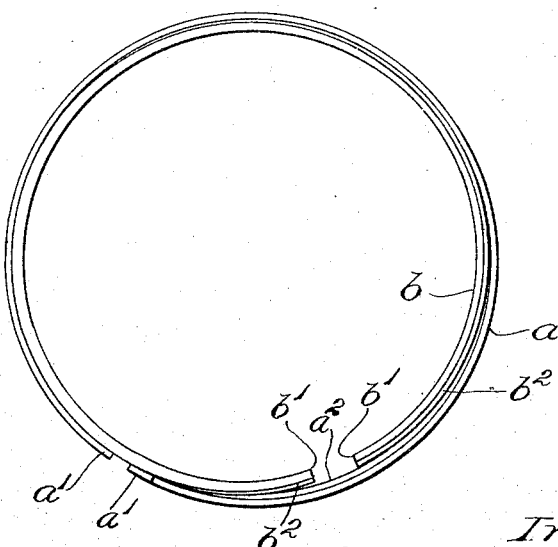
Fig. 3 is a plan view thereof.

In each of the illustrated embodiments of the invention, the alteration of the width of the assembled unit through relative rotary shift of its component members or elements is provided for by constructing the latter so as to have screw-threaded connection with each other. Thus, referring more particularly to Figs. 1 to 7, the outer ring-shaped member or element, a, is internally threaded and the inner one, b, externally threaded, and the two screw-threaded portions, $a^2$, $b^2$, are adapted for mutual engagement. In Fig. 8, the outer and inner members or elements are correspondingly screw-threaded and engaged with one another. In virtue of this mode of engagement, relative turning movement of the outer ring-shaped member or members and inner member will effect relative axial shift or displacement of the component members or elements of a packing ring and thereby vary the total width of the packing ring. In the case of the first embodiment, the adjustment will cause the top edge of the inner member or element b to project more or less above the top edge of the outer member a, in manner obvious from Figs. 1 and 2. In the case of the second embodiment, the adjustment will cause the outer members or elements $a^9$, $a^9$, respectively, to project more or less at both top and bottom of the inner member or element $b^9$.

Hand adjustment for width may be depended upon in some cases, but I have found that automatic or self-adjustment may be secured.

Preferably, I ensure automatic or self-adjustment of the packing ring in the proper direction to take up lost motion within the piston groove by forming, as shown in the drawings, the screw-threaded interengaging portions of its ring-shaped members or elements on a taper. Thus, in the case of the first embodiment aforesaid of the invention, I form the inwardly facing screw-threaded portion $a^2$, Fig. 7, of the external member or element a tapered in one direction, and form the screw-threaded outer circumference $b^2$ of the inner member or element b reversely tapered to match or fit said outer member or element. The result of this construction is that when the two ring-shaped members or elements, properly related, occupy the piston groove, the tendency of the inner member or element b to expand, coupled with the continual slight working of the two members or elements a, b, upon each other, will operate automatically to increase the width of the packing ring because of the tendency of the inner member or element b to work axially out of the outer member or element a in the direction of the outward flare of the latter.

The component divided ring-members or elements are, in being placed together preparatory to insertion into a groove in a piston, so combined and so adjusted relative to each other that they break joint with each other, i. e., the opening or interruption between the ends of the inner member occupies a position offset angularly with reference to that between the ends of the outer member. Thereby, as will appear from Fig. 2, the inner member or element covers the interruption or opening in the outer member or element, and vice versa. With the two members or elements related properly to fit substantially the groove within which they are applied, only a limited extent of turning movement can occur, less than enough to carry the openings of the two members or elements around into register with each other. In the case of the construction shown in Fig. 8, the inner member or element $b^9$, has a double taper, namely in both directions from the middle of its width toward its edges, while the outer members or elements $a^9$, $a^9$, are conversely tapered to fit the respective portions of member or element to which they are applied. Preferably, the screw-threads upon the upper and lower portions of the inner member are respectively right-hand and left-hand, in order that turning movement in a given direction may cause the two outer members to move simultaneously either toward or from each other, as the case may be.

I claim as my invention—

1. A packing ring comprising component ring-members, one radially inside the other, with the external periphery of the inside ring engaged with the internal surface of the outside ring by means whereby relative rotary adjustment of one ring-member with respect to the other operates to vary the width of the packing ring axially.

2. A packing ring comprising ring-members in mutual screw-threaded engagement whereby relative rotary adjustment of the said ring-members is caused to vary the width of the packing ring axially.

3. A packing ring comprising component ring-members provided with screw-threaded interengaging portions formed on a taper whereby said packing ring is rendered self-adjusting in respect of its axial width during its operation upon a piston.

4. A packing ring comprising divided ring-members in mutual screw-threaded engagement providing for relative rotary adjustment of said members into positions in which they break joint with each other, and for varying the width of the packing ring axially.

In testimony whereof I affix my signature in presence of two witnesses.

GEO. T. CLARK.

Witnesses:
CHAS. F. RANDALL,
ROBERT K. RANDALL.